United States Patent
Yoon et al.

(10) Patent No.: US 10,868,619 B2
(45) Date of Patent: Dec. 15, 2020

(54) METHOD AND USER EQUIPMENT FOR PERFORMING MEASUREMENT, AND METHOD AND BASE STATION FOR CONFIGURING MEASUREMENT

(71) Applicant: LG Electronics Inc., Seoul (KR)

(72) Inventors: Sukhyon Yoon, Seoul (KR); Hyunsoo Ko, Seoul (KR); Kijun Kim, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/248,303

(22) Filed: Jan. 15, 2019

(65) Prior Publication Data

US 2019/0149253 A1 May 16, 2019

Related U.S. Application Data

(63) Continuation of application No. PCT/KR2018/007417, filed on Jun. 29, 2018.
(Continued)

(51) Int. Cl.
*H04B 17/318* (2015.01)
*H04B 7/26* (2006.01)
*H04B 17/24* (2015.01)

(52) U.S. Cl.
CPC ............ *H04B 17/318* (2015.01); *H04B 7/26* (2013.01); *H04B 7/2621* (2013.01); *H04B 17/24* (2015.01)

(58) Field of Classification Search
CPC .... H04B 17/318; H04B 7/2621; H04B 17/24; H04B 7/26; H04L 1/06; H04L 5/0023; H04L 1/0061; H04L 1/0025; H04L 1/0041; H04L 1/0059; H04L 5/0048; H04L 5/0053; H04L 25/0226; H04L 5/001;
(Continued)

(56) References Cited

U.S. PATENT DOCUMENTS

2010/0309797 A1 12/2010 Lindoff et al.
2015/0312784 A1* 10/2015 You ....................... H04L 1/0693
370/252
(Continued)

FOREIGN PATENT DOCUMENTS

EP 1742402 1/2007
EP 3025540 6/2016
(Continued)

OTHER PUBLICATIONS

Sierra Wireless, "NR PBCH Design Consideration," R1-1708362, 3GPP TSG RAN WG1 Meeting #89, Hangzhou, P. R. China, May 15-19, 2017, 3 pages.
(Continued)

*Primary Examiner* — Hardikkumar D Patel
(74) *Attorney, Agent, or Firm* — Fish & Richardson P.C.

(57) ABSTRACT

A received signal strength indicator (RSSI) measurement time resource is provided to a user equipment. RSSI measurement symbol information indicating OFDM symbols from which the UE measures RSSI in a time resource unit for RSSI measurement (hereinafter, an RSSI measurement time resource unit) is provided to the user equipment. The user equipment measures RSSI from the OFDM symbols indicated by the RSSI measurement symbol information in RSSI measurement time resource unit(s).

11 Claims, 6 Drawing Sheets

Related U.S. Application Data

(60) Provisional application No. 62/566,547, filed on Oct. 2, 2017, provisional application No. 62/527,017, filed on Jun. 29, 2017.

(58) Field of Classification Search
CPC ....... H04L 5/0035; H04L 12/911; H04L 5/00; H04L 1/0693; H04L 5/0007; H04L 47/822; H04L 5/0051; H04L 27/2613; H04W 72/04; H04W 74/0816; H04W 72/0413; H04W 72/044; H04W 28/06; H04W 72/12; H04W 72/02; H04W 92/18; H04W 76/14; H04W 24/08; H04W 24/10; H04W 48/16; H04W 84/045; H04W 88/02; H04W 36/0088
See application file for complete search history.

(56) References Cited

U.S. PATENT DOCUMENTS

| | | | |
|---|---|---|---|
| 2016/0183276 A1* | 6/2016 | Marinier | H04W 72/12 370/329 |
| 2016/0192334 A1 | 6/2016 | Takeda et al. | |
| 2016/0218816 A1 | 7/2016 | Horiuchi et al. | |

FOREIGN PATENT DOCUMENTS

| | | |
|---|---|---|
| JP | 2017513295 | 5/2017 |
| KR | 1020140141622 | 12/2014 |
| KR | 1020160013506 | 2/2016 |
| KR | 1020160099626 | 8/2016 |
| KR | 1020160129902 | 11/2016 |
| WO | WO2015012900 | 1/2015 |
| WO | WO2017018446 | 2/2017 |
| WO | WO2017075795 | 5/2017 |

OTHER PUBLICATIONS

Ericsson, "Further Analysis of Signal Quality Measurement for Mobility in NR," R4-1706840, 3GPP TSG RAN WG4 Meeting NR #2, Qingdao, China, dated Jun. 27-29, 2017, 5 pages, XP051302879.
Extended European Search Report in European Application No. 18825088.0, dated Feb. 28, 2020, 7 pages.
LG Electronics, "Remaining details on L3 measurement and mobility management," R1-1717932, 3GPP TSG RAN WG1 Meeting #90bis, Prague, Czech Republic, dated Oct. 9-13, 2017, 12 pages.
Japanese Office Action in Japanese Application No. 2019-553968, dated Aug. 25, 2020, 5 pages (with English translation).
Indian Office Action in Indian Application No. 201927017107, dated Sep. 28, 2020, 6 pages (with English translation).

* cited by examiner

METHOD AND USER EQUIPMENT FOR PERFORMING MEASUREMENT, AND METHOD AND BASE STATION FOR CONFIGURING MEASUREMENT

CROSS-REFERENCE TO RELATED APPLICATIONS

This application is a U.S. Application under 35 U.S.C. 11(a) which claims the benefit of the PCT International Application No. PCT/KR2018/007417, filed on 29 Jun. 2018. The PCT International Application No. PCT/KR2018/007417 claims priority under 35 U.S.C. 119(e) to U.S. Provisional Application Nos. 62/527,017 filed on 29 Jun. 2017 and 62/566,547 filed on 2 Oct. 2017 which are hereby incorporated by reference here in their entirety.

TECHNICAL FIELD

The present invention relates to a wireless communication system. More particularly, the present invention relates to a method and apparatus for configuring or indicating measurement.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of performing measurement by a user equipment in a wireless communication system. The method includes: receiving received signal strength indicator (RSSI) measurement symbol information; and measuring an RSSI in a time resource unit for RSSI measurement (hereinafter, an RSSI measurement time resource unit) based on the RSSI measurement symbol information. The RSSI is measured from orthogonal frequency division multiplexing (OFDM) symbols indicated by the RSSI measurement symbol information in the RSSI measurement time resource unit.

According to another aspect of the present invention, provided herein is a user equipment for performing measurement in a wireless communication system. The user equipment includes a transceiver, and a processor configured to control the transceiver. The processor is configured to: control the transceiver to receive received signal strength indicator (RSSI) measurement symbol information; and measure an RSSI based on the RSSI measurement symbol information in a time resource unit for RSSI measurement (hereinafter, an RSSI measurement time resource unit) based on the RSSI measurement symbol information. The processor is configured to measure the RSSI from orthogonal frequency division multiplexing (OFDM) symbols indicated by the RSSI measurement symbol information in the RSSI measurement time resource unit.

According to another aspect of the present invention, provided herein is method of configuring measurement for a user equipment by a base station in a wireless communication system. The method includes: transmitting RSSI measurement resource information including configuration information on one or more time resource units for received signal strength indicator (RSSI) measurement (hereinafter, RSSI measurement time resource unit) and including RSSI measurement symbol information indicating orthogonal frequency division multiplexing (OFDM) symbols for RSSI measurement among OFDM symbols of the RSSI measurement time resource; and receiving reference signal received quality (RSRQ) related to the RSSI measurement resource information.

According to another aspect of the present invention, provided herein is a base station for configuring measurement for a user equipment in a wireless communication system. The base station includes a transceiver, and a processor configured to control the transceiver. The processor is configured to: control the transceiver to transmit measurement configuration information including information on one or more time resource units for received signal strength indicator (RSSI) measurement (hereinafter, RSSI measurement time resource units) and including information indicating orthogonal frequency division multiplexing (OFDM) symbols for RSSI measurement among OFDM symbols of the RSSI measurement time resource; and control the transceiver to receive reference signal received quality (RSRQ) associated with the measurement configuration information.

In each aspect of the present invention, the RSSI measurement symbol information may indicate one of predefined formats representing RSSI measurement symbol locations.

In each aspect of the present invention, the RSSI measurement symbol information is common to RSSI measurement time resource units within a measurement window.

In each aspect of the present invention, each of the RSSI measurement time resource units consists of a plurality of consecutive OFDM symbols.

In each aspect of the present invention, information on the measurement window and information on the RSSI measurement time resource units within the measurement window may be transmitted by the base station to the user equipment.

In each aspect of the present invention, the measurement window may include a resource of a synchronization signal (SS) block consisting of an SS and a physical broadcast channel.

The above technical solutions are merely some parts of the embodiments of the present invention and various embodiments into which the technical features of the present invention are incorporated can be derived and understood by persons skilled in the art from the following detailed description of the present invention.

Advantageous Effects

According to an embodiment of the present invention, a radio communication signal can be efficiently transmitted/received. Therefore, the total throughput of a wireless communication system can be raised.

According to an embodiment of the present invention, delay/latency occurring in a communication process between a UE and a BS can be lowered.

In addition, signals can be transmitted/received in a system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
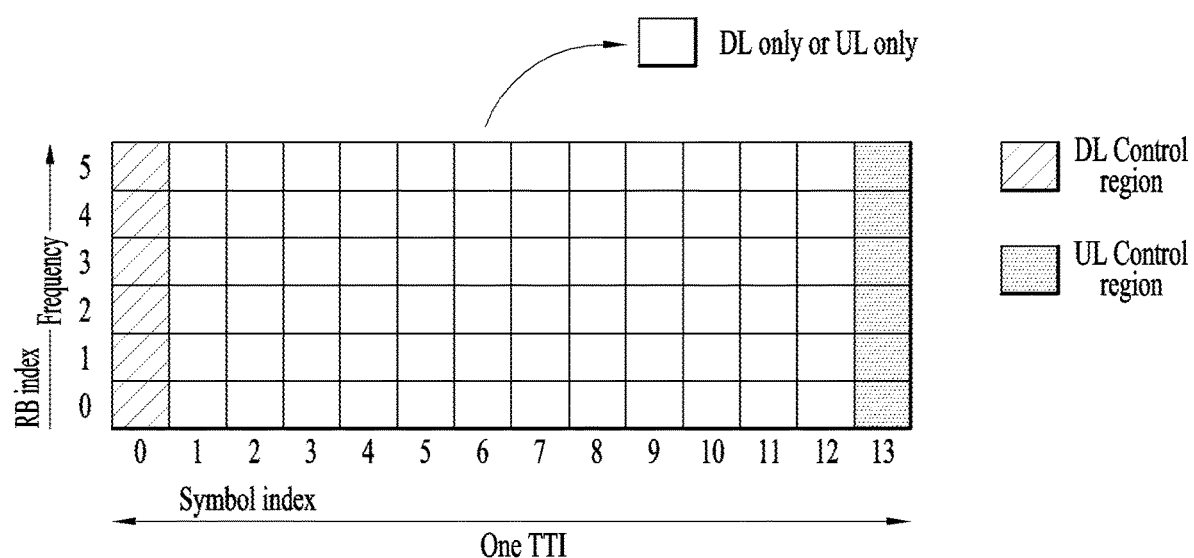
FIG. 1 illustrates a subframe structure available in a new radio access technology (NR).

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, NB, eNB, gNB and etc. will be referred to as a BS.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), gNB, a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a BS or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a BS is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a slot configured for transmission of the TRS is referred to as a TRS slot. Moreover, a slot in which a broadcast signal is transmitted is referred to as a broadcast slot or a PBCH slot and a slot in which a synchronization signal (e.g. PSS and/or SSS) is transmitted is referred to a synchronization signal slot or a PSS/SSS slot. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.300, and 3GPP TS 38.331.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

OFDM Numerology

The new RAT system uses an OFDM transmission scheme or a similar transmission scheme. For example, the new RAT system may follow the OFDM parameters defined in the following table. The new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

Slot Structure

In the 3GPP LTE/LTE-A system, radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. The basic time unit for LTE is $T_s$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

FIG. 1 illustrates a slot structure available in a new radio access technology (NR).

To minimize data transmission latency, in a 5G new RAT, a slot structure in which a control channel and a data channel are time-division-multiplexed is considered.

In FIG. 1, the hatched area represents the transmission region of a DL control channel (e.g., PDCCH) carrying the DCI, and the black area represents the transmission region of a UL control channel (e.g., PUCCH) carrying the UCI. Here, the DCI is control information that the BS transmits to the UE. The DCI may include information on cell configuration that the UE should know, DL specific information such as DL scheduling, and UL specific information such as UL grant. The UCI is control information that the UE transmits to the BS. The UCI may include a HARQ ACK/NACK report on the DL data, a CSI report on the DL channel status, and a scheduling request (SR).

In FIG. 1, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 2, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the BS and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, a basic transmission unit is a slot. A slot duration may consist of 14 symbols with a normal cyclic prefix (CP) or 12 symbols with an extended CP. The slot is scaled in time as a function of a used subcarrier spacing. That is, if the subcarrier spacing increases, the length of the slot is shortened. For example, when the number of symbols per slot is 14, the number of slots in a 10-ms frame is 10 at a subcarrier spacing of 15 kHz, 20 at a subcarrier spacing of 30 kHz, and 40 at a subcarrier spacing of 60 kHz. If a subcarrier spacing increases, the length of OFDM symbols is shortened. The number of OFDM symbols in a slot depends on whether the OFDM symbols have a normal CP or an extended CP and does not vary according to subcarrier spacing. A basic time unit used in the LTE system, $T_s$, is defined as $T_s=1/(15000*2048)$ seconds in consideration of a basic subcarrier spacing of 15 kHz and a maximum TFT size 2048 of the LTE system and corresponds to a sampling time for a subcarrier spacing of 15 kHz. In the NR system, various subcarrier lengths in addition to the subcarrier spacing of 15 kHz may be used. Since the subcarrier spacing and a corresponding time length are inversely proportional, an actual sampling time corresponding to subcarrier spacings greater than 15 kHz is shorter than $T_s=1/(15000*2048)$ seconds. For example, actual sampling times for subcarrier spacings of 30 kHz, 60 kHz, and 120 kHz will be $1/(2*15000*2048)$ seconds, $1/(4*15000*2048)$ seconds, and $1/(8*15000*2048)$ seconds, respectively.

Analog Beamforming

A recently discussed fifth generation (5G) mobile communication system is considering using an ultrahigh frequency band, i.e., a millimeter frequency band equal to or higher than 6 GHz, to transmit data to a plurality of users in a wide frequency band while maintaining a high transmission rate. In 3GPP, this system is used as NR and, in the present invention, this system will be referred to as an NR system. Since the millimeter frequency band uses too high a frequency band, a frequency characteristic thereof exhibits very sharp signal attenuation depending on distance. Therefore, in order to correct a sharp propagation attenuation characteristic, the NR system using a band of at least above 6 GHz uses a narrow beam transmission scheme to solve a coverage decrease problem caused by sharp propagation attenuation by transmitting signals in a specific direction so as to focus energy rather than in all directions. However, if a signal transmission service is provided using only one narrow beam, since a range serviced by one BS becomes narrow, the BS provides a broadband service by gathering a plurality of narrow beams.

In the millimeter frequency band, i.e., millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5 k (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which the BS or the UE transmits the same signal using a proper phase difference through a large number of antennas so that energy increases only in a specific direction. Such a beamforming scheme includes digital beamforming for imparting a phase difference to a digital baseband signal, analog beamforming for imparting a phase difference to a modulated analog signal using time latency (i.e., cyclic shift), and hybrid beamforming using both digital beamforming and analog beamforming. If a transceiver unit (TXRU) is provided for each antenna element to enable adjustment of transmit power and phase, independent beamforming is possible for each frequency resource. However, installing TXRU in all of the about 100 antenna elements is less feasible in terms of cost. That is, the millimeter frequency band needs to use numerous antennas to correct the sharp propagation attenuation characteristic. Digital beamforming requires as many radio frequency (RF) components (e.g., a digital-to-analog converter (DAC), a mixer, a power amplifier, a linear amplifier, etc.) as the number of antennas. Therefore, if digital beamforming is desired to be implemented in the millimeter frequency band, cost of communication devices increases. Hence, when a large number of antennas is needed as in the millimeter frequency band, use of analog beamforming or hybrid beamforming is considered. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous.

The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

As mentioned above, digital BF may simultaneously transmit or receive signals in multiple directions using multiple beams by processing a digital baseband signal to be transmitted or received, whereas analog BF cannot simultaneously transmit or receive signals in multiple directions exceeding a coverage range of one beam by performing BF in a state in which an analog signal to be transmitted or received is modulated. Typically, the BS simultaneously performs communication with a plurality of users using broadband transmission or multi-antenna characteristics. If the BS uses analog or hybrid BF and forms an analog beam in one beam direction, the eNB communicates with only users included in the same analog beam direction due to an analog BF characteristic. A RACH resource allocation method and a resource use method of the BS according to the present invention, which will be described later, are proposed considering restrictions caused by the analog BF or hybrid BF characteristic.

Hybrid Analog Beamforming

Figure 2:
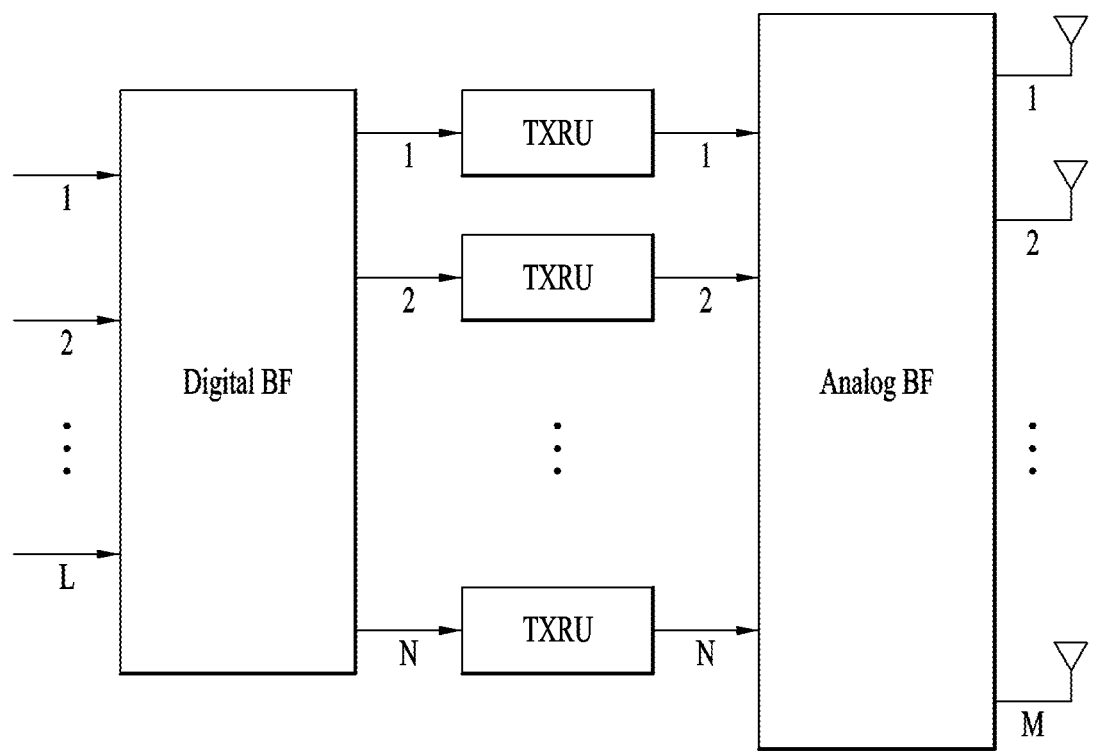
FIG. 2 abstractly illustrates transceiver units (TXRUs) and a hybrid beamforming structure in terms of physical antennas.

FIG. 2 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit (or transceiver) performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 2, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Radio Resource Management (RRM) Measurement in LTE

The LTE/LTE-A system supports an RRM operation including power control, scheduling, cell search, cell re- selection, handover, radio link or connection monitoring, connection establishment/re-establishment, and the like. In this case, a serving cell may request that the UE transmit RRM measurement information, which is a measurement value for performing the RRM operation. Typically, in the LTE/LTE-A system, the UE may measure cell search information, reference signal received power (RSRP), and reference signal received quality (RSRQ) of each cell and report the same. Specifically, in the LTE/LTE-A system, the UE receives measConfig as a higher-layer signal for RRM measurement from the serving cell. The UE measures RSRP or RSRQ according to information of measConfig. RSRP, RSRQ, and a received signal strength indicator (RSSI) according to 3GPP TS 36.214, which is the standard specification of the LTE/LTE-A system, are defined as follows.

RSRP

Reference signal received power (RSRP), is defined as the linear average over the power contributions (in [W]) of the resource elements that carry cell-specific reference signals within the considered measurement frequency bandwidth. For RSRP determination the cell-specific reference signals R0 according to 3GPP TS 36.211 shall be used. If the UE can reliably detect that R1 is available it may use R1 in addition to R0 to determine RSRP. The reference point for the RSRP shall be the antenna connector of the UE. If receiver diversity is in use by the UE, the reported value shall not be lower than the corresponding RSRP of any of the individual diversity branches.

RSRQ

Reference Signal Received Quality (RSRQ) is defined as the ratio N*RSRP/(E-UTRA carrier RSSI), where N is the number of resource blocks (RBs) of the E-UTRA carrier RSSI measurement bandwidth. The measurements in the numerator and denominator shall be made over the same set of resource blocks. E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes. The reference point for the RSRQ shall be the antenna connector of the UE. If receiver diversity is in use by the UE, the reported value shall not be lower than the corresponding RSRQ of any of the individual diversity branches.

RSSI

The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches.

In the LTE system, RSSI has basically been configured to be measured in an OFDM symbol in which a CRS is present. Thereafter, as standardization has evolved, RSSI has been configured to be measured in all OFDM symbols of configured subframes.

According to the above definition, the UE operating in the LTE/LTE-A system may measure RSRP in a bandwidth corresponding to one of 6, 15, 25, 50, 75, and 100 RBs, based on an allowed measurement bandwidth related information element (IE) transmitted in system information block type 3 (SIB3) in the case of intra-frequency measurement and based on an allowed measurement bandwidth related IE transmitted in system information block type 5 (SIB5) in the case of inter-frequency measurement. Alternatively, in the absence of the IE, the UE may measure RSRP in all frequency bands of a DL system by default. Upon receiving information about an allowed measurement bandwidth, the UE may regard a corresponding value as a maximum measurement bandwidth and freely measure the value of RSRP within the corresponding value. However, if a serving cell transmits an IE defined as a wide band RSRQ (WB-RSRQ) and sets the allowed measurement bandwidth to 50 RBs or more, the UE needs to calculate the value of RSRP for a total allowed measurement bandwidth. Meanwhile, RSSI is measured in a frequency bandwidth of a receiver of the UE according to definition of an RSSI bandwidth.

RRM According to the Present Invention

The present invention proposes a method of performing DL measurement (for the purpose of cell selection) by the UE, when one cell includes one or more transmission and reception points (TRPs) in a wireless communication system including BS(s) and UE(s) and when each TRP may perform signal transmission in the directions of a plurality of analog beams according to a hybrid BF (or analog BF) scheme.

Recently, the 3GPP standardization organization is considering network slicing to achieve a plurality of logical networks in a single physical network in a new RAT system, i.e., an NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in each time and frequency resource region.

Recently, as data traffic remarkably increases with appearance of smart devices, the NR system is needed to support higher communication capacity (e.g., data throughput). One method considered to raise communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a digital-to-analog (D/A) or analog-to-digital (A/D) converter. This structure increases hardware complexity and consumes high power which may not be practical. Accordingly, when multiple antennas are used, the NR system considers the above-mentioned hybrid BF method in which digital BF and analog BF are combined.

Figure 3:
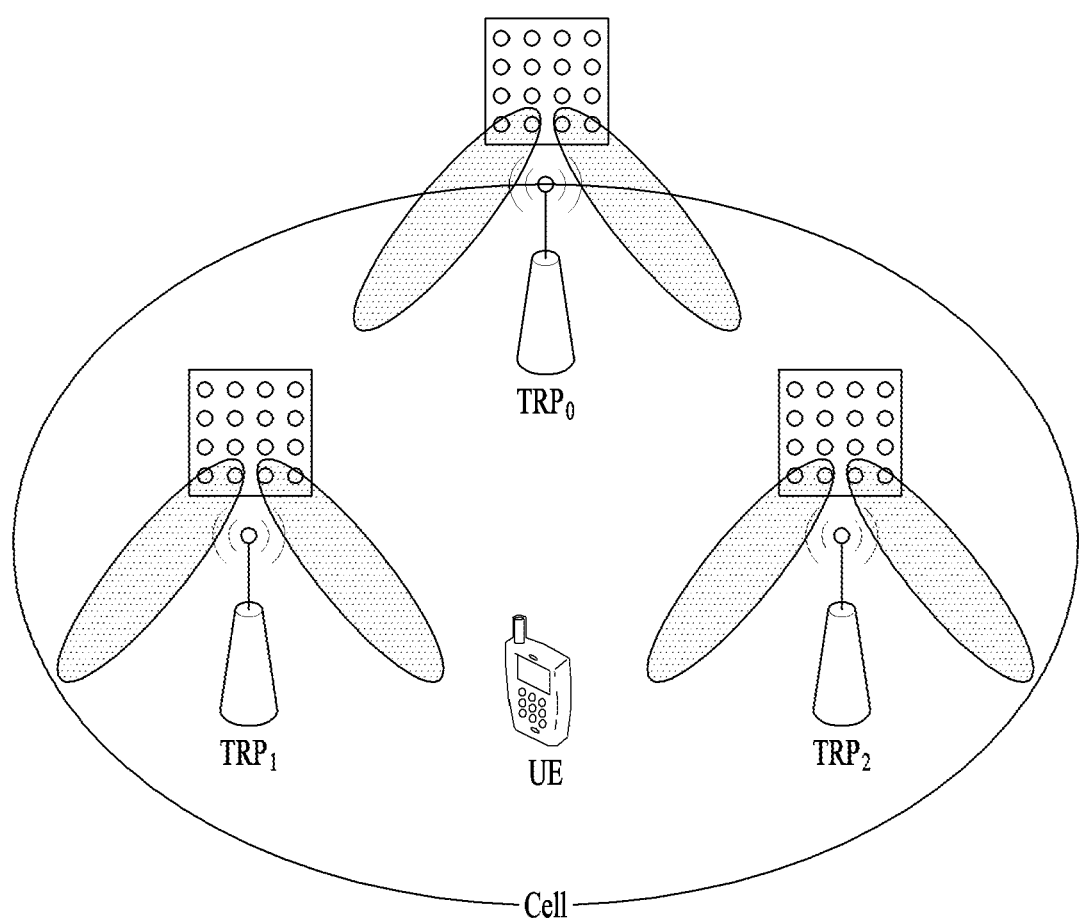
FIG. 3 illustrates a cell of a new radio access technology (NR) system.

FIG. 3 illustrates a cell of a new radio access technology (NR) system.

Referring to FIG. 3, in the NR system, a method in which a plurality of TRPs configures one cell is under discussion unlike a wireless communication system of legacy LTE in which one BS forms one cell. If the plural TRPs configure one cell, seamless communication can be provided even when a TRP that provides a service to a UE is changed to another TRP so that mobility management of the UE is facilitated.

In the LTE/LTE-A system, PSS/SSS are transmitted omni-directionally. Meanwhile, a method is considered in which a BS to which millimeter wave (mmWave) is applied transmits signals such as PSS/SSS/PBCH through BF while sweeping beam directions omnidirectionally. Transmission/reception of signals while sweeping beam directions is referred to as beam sweeping or beam scanning. For example, assuming that the BS can have a maximum of N beam directions, the BS transmits signals such as the PSS/SSS/PBCH in each of the N beam directions. That is, the BS transmits synchronization signals such as the PSS/SSS/PBCH in each direction while sweeping directions that the BS can have or the BS desires to support. Alternatively, when the BS can form N beams, one beam group may be configured by grouping a few beams and the PSS/SSS/PBCH may be transmitted/received with respect to each beam group. In this case, one beam group includes one or more beams. Signals such as the PSS/SSS/PBCH transmitted in the same direction may be defined as one synchronization signal (SS) block and a plurality of SS blocks may be present in one cell. When the plural SS blocks are present, SS block indexes may be used to distinguish between the SS blocks. For example, if the PSS/SSS/PBCH are transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

In a multi-beam environment, RRM is destined to cause the UE to measure a signal of a specific cell/beam so that the UE may select a cell/beam capable of providing the best service thereto. In an idle mode, the UE first detects a synchronization signal of a cell to acquire time-frequency synchronization for the cell and then measures a specific signal of the cell. The UE may perform measurement for a plurality of cells and select a cell having best quality to attempt to enter the cell. Alternatively, a network may hand over the UE to a specific cell. In NR, which is also called 5G, if the PSS/SSS/PBCH is transmitted through BF, it is difficult to simply specify cell-specific RRM unlike LTE because a plurality of SS blocks may be present within one cell.

Measurement of RSRQ and/or RSSI (hereinafter, RSRQ/RSSI) in the multi-beam environment will be briefly described below.

1. Environment in which network coordination is not provided: RSRQ/RSSI per cell rather than RSRQ/RSSI per beam is measured/calculated.
   RSRQ per cell is measured.
   RSSI measurement resource (configured by the network for the UE).
      The network configures the RSSI measurement resource using a resource necessarily including an RS used for RSRP measurement.
      The RSSI measurement resource should include a time/frequency resource which covers all beam directions or one or more beams.
   Calculation of RSSI value
      The RSSI value is calculated through normalization using the number of REs included in the RSSI measurement resource.
      Case in which the subcarrier spacing of an SS block (or CSI-RS) in the RSSI measurement resource is different from the subcarrier spacing of data other than the SS block
         RSSI is measured by assuming the subcarrier spacing of an RSRP measurement RS (e.g., SS block or CSI-RS) in a corresponding resource.
         The number of REs is calculated based on a subcarrier spacing assumed for RSSI measurement.

RSRP value used for RSRQ calculation and RS used for RSRP measurement
RSRQ is calculated using RSRP based on an RS included in the RSSI measurement resource.
If an SS block is included in the RSSI measurement resource, RSRQ is calculated using SS block RSRP (conversely, if a CSI-RS is included in the RSSI measurement resource, RSRQ is calculated using CSI-RS RSRP).
RSRP used in this case is RSRP of a cell unit calculated using RSRP per beam.

2. In an environment in which network coordination is provided, RSRQ/RSSI per beam is measured and calculated.
RSRQ per beam is calculated.
RSSI per beam is measured to calculate RSRQ per beam.
The network signals the RSSI measurement resource.
A resource including an RS used for RSRP measurement per beam is configured as the RSSI measurement resource.
A plurality of RSSI measurement resources may be configured for the UE.

In the multi-beam environment, since BF is individually performed with respect to each cell, interference of a neighbor cell affecting a specific serving beam is randomly changed over time so that it may be difficult to regard the interference as having a predetermined pattern. Then, in the multi-beam environment of NR, while RSRP is measured with respect to each beam, RSSI measurement per beam is not very meaningful. Accordingly, in the multi-beam environment, the UE selects an optimal beam in terms of a received signal by measuring RSRP per beam and measures RSSI, which is needed to calculate signal quality considering noise and interference, with respect to each cell (i.e., in units of cells). To measure RSSI, the UE measures the strengths of all signals received in a given time/frequency resource.

The network designates a time/frequency region for measuring RSSI and signals the region to the UE. The network indicates a predetermined time window rather than a specific time point in time to the UE so that the UE may measure RSSI during the time window. The network designates a bandwidth for RSSI measurement as a broad band to cause the UE to measure RSSI which is representative of a cell. Particularly, in the present invention, the network configures a time/frequency resource for RSSI measurement so as to satisfy the following conditions:
An RS (an SS block and/or a CSI-RS) used for RSRP measurement is necessarily included in the corresponding resource; and/or
If the RS for RSRP measurement is beamformed, the RS for RSRP measurement is included in the time/frequency resource for RSSI measurement with respect to all swept beam directions.

Figure 4:
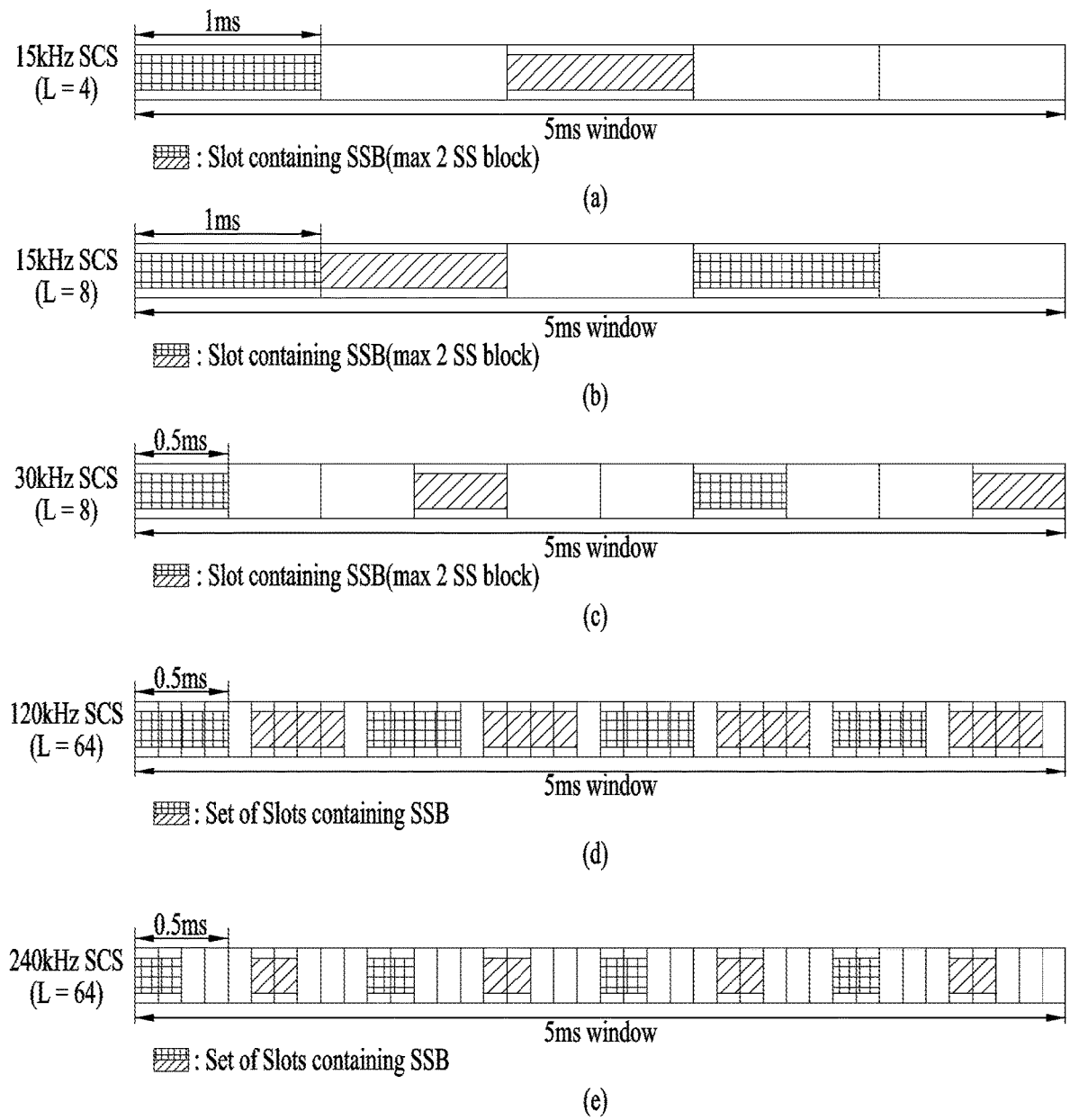
FIG. 4 illustrates synchronization signal blocks according to subcarrier spacing.

FIG. 4 illustrates synchronization signal blocks according to subcarrier spacing. In FIG. 4, L denotes the maximum number of synchronization signal blocks (i.e., the maximum number of DL beam directions that can be formed on a cell). In an NR system, the number of slots in a window of 5 ms is 5 in a subcarrier spacing of 15 kHz, 10 in a subcarrier spacing of 30 kHz, 20 in a subcarrier spacing of 60 kHz, 40 in a subcarrier spacing of 120 kHz, and 40 in a subcarrier spacing of 240 kHz. Each slot may include a maximum of 2 SS blocks (i.e., SSBs). Hereinafter, the present invention is described under the assumption that a 5-ms window of FIG. 4 is a measurement window.

If the UE measures RSSI while the BS performs beam sweeping by randomly changing a beam, then RSSI may well reflect an inter-cell characteristic. However, if the UE measures RSSI only when the BS transmits a signal in a limited beam direction, i.e., if the UE measures RSSI only for a specific beam, since such RSSI cannot be representative of load to which a cell is subjected, it is difficult to regard such RSSI as an RSSI value representative of the cell. Therefore, it is desirable that the UE measure RSSI including a duration in which the BS transmits a signal in as many beam directions as possible. Considering this, the BS should designate a time/frequency region for RSSI measurement, including a time/frequency resource for transmitting at least SS blocks. If a CSI-RS is configured in a serving cell and the network configures the UE to measure RSRP using the CSI-RS, an RSSI measurement region configured by the network is designated to include a time/frequency region including the CSI-RS for RRM. For example, in FIG. 4, when L=8, the RSSI measurement resource should be a time/frequency resource including 8 SS blocks. The RSSI measurement region may be configured by contiguous resources. However, the RSSI measurement region may be configured by discontinuous resources in the time domain, for example, by a time resource region including a plurality of SS blocks present in different slots.

After measuring all signals received in the time/frequency resource configured by the network, the UE should normalize the measured signals using the number of REs in the measured time/frequency resource in order to calculate RSSI per RE in the configured time/frequency resource. If a subcarrier spacing used to transmit an SS block and a subcarrier spacing used to transmit a data channel differ in the RSSI measurement region, a solution thereto is needed. For example, the UE should be configured or defined to perform RSSI measurement based on the subcarrier spacing of the SS block or should be configured or defined to perform RSSI measurement based on the subcarrier spacing of the data. The network may also signal a numerology for RSSI measurement, particularly, a subcarrier spacing. Upon considering that the UE should perform measurement for the SS block, it is desirable that the UE be configured/defined to perform RSSI measurement based on the subcarrier spacing of the SS block in a time/frequency resource in which RSSI should be measured. Upon calculating an RSSI value, the UE calculates the number of REs in the time/frequency resource based on a subcarrier spacing used thereby for RSSI measurement and performs normalization for all measured signals using the number of REs.

The network determines whether to configure a resource including the SS block as an RSSI measurement resource or a resource including the CSI-RS as the RSSI measurement resource. If the SS block is included in the RSSI measurement resource, the UE uses SS block based RSRP upon calculating RSRQ. If the CSI-RS is included in the RSSI measurement resource, the UE uses CSI-RS based RSRP upon calculating RSRQ.

That is, RSRQ is typically calculated as RSRQ=RSRP/RSSI. In a multi-beam environment in which network coordination is not provided or network coordination is scarcely provided, RSRP for calculating RSRQ is calculated using RSRP of a cell unit. To calculate RSRQ, whether to use SS block based RSRP or CSI-RS based RSRP may depend on type of an RS included in a resource for RSSI measurement. In addition, it is desirable to calculate RSRQ using RSRP of a cell unit derived from RSRP of a beam unit rather than using RSRP measured in the beam unit. Herein, RSRP of the cell unit, $RSRP_{cell}$, is a value that can be calculated by a function of RSRP of the beam unit, RSRP[i]. For example, $RSRP_{cell}$=func(RSRP[i], i∈{0, 1, . . . , Ntx}), wherein i represents a beam index and Ntx represents the number of DL transmission beams.

In the multi-beam environment in which network coordination cannot be expected, it is expected that interference will be severely fluctuated by beam directions of its own cell and a neighbor cell. Therefore, RSSI for a specific beam direction in this situation is not representative of the size of load/interference to which a measurement target cell is subjected and, thus, it is difficult to assign any meaning. However, RSSI in a multi-beam environment in which network coordination is provided or RSSI in a single beam environment may be very useful as a value representative of the size of loading/interference of the cell.

In the multi-beam environment in which network coordination is provided, it is desirable to calculate/measure RSRQ per beam using RSSI per beam. In this case, RSSI may be configured/defined to be measured per beam, i.e., per SS block (or per CSI-RS). That is, a time/frequency region for measuring RSSI may differ according to beam. For example, a plurality of different time/frequency resources may be configured by the network for the UE to measure RSSI. Similarly, when necessary, the network may configure a time/frequency resource for measuring RSSI per beam. In this case, the time/frequency resource per beam for measuring RSSI should include an RS for measuring RSRP per beam. For example, if the network (or BS) commands the UE to measure RSRP using an SS block, a resource for RSSI measurement should include the SS block and, if the network (or BS) commands the UE to measure RSRP using a CSI-RS, the resource for RSSI measurement should include the CSI-RS. A resource for RSSI measurement for a specific SS block index should be a resource including the SS block because the resource for RSSI measurement is a resource for RSSI measurement per beam. In this case, RSRQ is calculated per beam and RSRQ[i]=RSRP[i]/RSSI[i], wherein i∈{0, 1, . . . , Ntx}, i represents a beam index, and Ntx represents the number of DL transmission beams.

The following schemes for example may be used for a resource in which the UE performs RSSI measurement.

Scheme 1) SS block RSSI (i.e., SS block based RSSI) is determined based on the strengths of all received signals in an SS block for which SS block RSRP is measured. A time/frequency resource for RSSI measurement may be defined to include an SS block for which SS block RSRP is measured per SS block. That is, SS block RSRP is measured for each SS block and the sum of the strengths of all signals received in an SS block for which SS block RSRP is measured is defined as SS block RSSI. In the case of a broad band, one or more bandwidth parts may be defined in the broad band and an SS block may be transmitted with respect to each bandwidth part. Although SS block RSRP is obtained by measuring RSRP of only a specific bandwidth part, SS block RSSI may be defined such that all signal values received from SS block(s) transmitted in the same beam direction placed at different frequency locations are used for the purpose of RSSI measurement of an SS block. It is obvious that normalization according to frequency size should be performed upon RSRQ calculation.

Scheme 2) In the LTE/LTE-A system, an RSSI measurement band is equal to an RSRP measurement band. The present invention proposes measuring RSSI in a signal transmission region which has the same beam pattern (i.e., the same DL transmission (Tx) beam) as an SS block and has a broader band than the SS block. According to system load and inter-cell interference, RSSI may be differently measured in each frequency band. In spite of such variation, it is desirable to distribute a frequency resource for measuring RSSI over a broad band in order to calculate a representative value of RSSI per SS block, i.e., a representative value of RSSI per beam direction. Therefore, the present invention proposes a scheme of measuring RSSI using a signal transmitted in a broader band than an SS block rather than using signal strength measured in the SS block. An RS and location for RSSI measurement in a signal band transmitted in a broader band than the SS block may be as follows.

RSSI may be measured in a band in which system information transmitted in a broader band than an SS block band, for example, remaining minimum system information (RMSI), and a paging channel/message are transmitted. That is, the strengths of all signals received in a corresponding block during a time/frequency duration in which RMSI per each SS block is transmitted (i.e., in a time/frequency region in which a channel carrying the RMSI is present) is defined as RSSI per SS block. In this case, the RMSI may be assumed to be transmitted with the same beam pattern as the SS block.

RSSI is measured at a timing at which system information is transmitted in a predetermined band configured by the network. RSSI is measured in a predetermined band configured by the network in a control region in which control information about the system information is transmitted (hereinafter, a control resource set (CORESET)) and/or a data symbol duration in which the system information is transmitted. That is, RSSI is measured in a predetermined frequency band in the CORESET duration and/or the data symbol duration and the predetermined frequency band is configured by the network.

Hereinabove, scheme(s) of measuring beam-common RSSI for an RSSI measurement resource configured by the network have been described. Hereinafter, a criterion and method of configuring the RSSI measurement resource by the network will be described.

Section 1) Measurement Window for RSSI Measurement

In the multi-beam environment, generally, the UE also operates using multiple reception beams. In this case, the UE measures respective RSRP values using the multiple reception beams and determines an RSRP value having the best value thereamong to be an RSRP value corresponding to a target beam of a target cell. Thus, since the UE should measure RSRP while sweeping reception beam directions, the UE cannot form an optimal reception beam with respect to a serving cell during a measurement window for measuring RSRP and communication quality of the UE with the serving cell significantly deteriorates. Therefore, the BS preconfigures a measurement gap (MG) for the RSRP measurement window and the UE performs RSRP measurement only in a predetermined duration. Generally, the measurement window indicates a time duration for measurement. If an MG is configured for the measurement window, communication between the BS and the UE is not performed during an MG duration.

Since RSSI may also greatly differ in the magnitude of power of a received signal according to a reception beam direction, the UE should measure RSSI while sweeping the reception beam direction in a similar way to RSRP measurement. Accordingly, as mentioned in description of RSRP measurement, it is desirable to form an MG even for RSSI measurement. Particularly, if the UE should perform RSSI measurement in a specific time duration, an MG for RSSI measurement independent of an MG for RSRP measurement may be desirably configured. However, as described above, since it is a basic principle to configure a time/frequency resource for RSSI measured to perform RSRQ measurement, i.e., an RSSI measurement resource, as a time duration including an RS for measuring RSRP, the RSSI measurement resource for RSRQ commonly uses the measurement window for RSRP measurement. Therefore, basically, RSSI may be limitedly measured within the measurement window for RSRP measurement, and which resource will be used within the RSRP measurement window as the RSSI measurement resource may be configured in detail. Generally, although an SS/PBCH block (i.e., SS block) and a CSI-RS may be used as RSs for measuring RSRP, other RSs may be defined for RSRP measurement. Hereinafter, an M-RS will be described as an RS for RSRP measurement.

However, when the network desires that RSSI per reception beam be measured for a purpose other than RSRQ measurement, for example, when the network desires that cell loading caused by substantial data transmission, rather than cell loading based on an always transmitted signal, be measured, the network may additionally configure a measurement window for RSSI measurement for the UE and configure a resource which will be used as an RSSI measurement resource within the additionally configured RSSI measurement window.

As mentioned previously, the resource for RSSI measurement is limited to resources within a configured measurement window. In particular, RSSI measurement for RSRQ measurement is limitedly performed within an RSRP measurement window if no additional indication is given. Next, a method of configuring a resource to determine which resource within the measurement window will be used as a measurement resource will be described. In this case, the method of configuring a resource used as the measurement resource among resources within the measurement window is described by basically using an SS/PBCH block as an M-RS based on an NR system and taking a measurement window including the SS/PBCH block as an example. However, the following methods of configuring the measurement resource within the measurement window may also be applied to an M-RS type, a time resource of which may vary according to configuration of the network/BS, such as a CSI-RS, i.e., an M-RS type having a dynamic resource configuration, as well as an M-RS, a transmission time resource of which is defined in the standard specification, such as the SS/PBCH block. For example, if the BS configures/allocates an MS of the M-RS type having the dynamic resource configuration within a predetermined measurement window and the UE forms a measurement window for this duration and operates in the measurement window, the following methods may equally be applied to the case in which the SS/PBCH block is used as the M-RS.

In the NR system, up to 64 SS/PBCH blocks (SSBs) are defined to be transmitted during a duration of 5 ms as illustrated in FIG. 4. The SS/PBCH blocks occupy, as illustrated in FIG. 4, a part of a total 5-ms measurement window and DL traffic, a DL control channel, UL traffic, or a UL control channel may be transmitted during the other durations. Since it is expected that there will be many cases in which fewer SS/PBCH blocks than those illustrated in FIG. 4 are transmitted in an actual network, a duration in which SS/PBCH blocks are transmitted and a duration in which SS/PBCH blocks are not transmitted may be present in significantly various forms within the measurement window. In this environment, which resource will be used to well indicate channel quality of an actual target frequency band or target cell for RSSI measurement needs to be considered. From this viewpoint, a measurement resource configured in units of OFDM symbols may provide much flexibility in terms of a resource configuration. However, the measurement resource configured in units of OFDM symbols may cause significant signaling overhead. Therefore, the present invention proposes a method of defining the measurement resource in units of slots or subslots defined as OFDM symbol sets and configuring an OFDM symbol to be used as a measurement symbol within the slot or the subslot. Herein, a subslot represents an OFDM symbol set and the size of the OFDM symbol set (i.e., the number of OFDM symbols constituting the OFDM symbol set) may be differently configured according to M-RS type or may be directly configured by the UE. The subslot or the slot may be equal according to the length of the subslot. That is, when 14 OFDM symbols are defined as the subslot, the subslot itself may mean the slot.

Section 2) Configuration of Slot or Subslot Level Within Measurement Window for RSSI Measurement In the multi-beam environment, the BS performs dynamic scheduling in various beam directions. In this environment, the size of a signal received by the UE exhibits a greatly fluctuating characteristic. Therefore, in order to measure channel quality reflecting a long-term characteristic such as RSRQ, the UE desirably measures the sizes of signals received from all beams. In this case, when a measurement window is configured for RSRP/RSSI measurement, all cells transmit M-RSs within the measurement window in a beam sweeping form. If the M-RSs of all cells should be transmitted within the measurement window, since this means that time synchronization between the cells should be basically matched, a synchronous operation may be particularly assumed at an OFDM symbol group level. Therefore, it is desirable to configure a measurement slot or a measurement subslot in a duration in which an M-RS is transmitted. However, this scheme is disadvantageous in that RSSI does not reflect traffic load to which an actual target cell is substantially subjected. To avoid this problem and cause RSSI to reflect traffic load, it is desirable to reflect traffic load by measuring RSSI in a duration in which an SS/PBCH block is not transmitted. However, since these schemes have respective advantages and disadvantages, a measurement duration may be configured by reflecting a characteristic according to an environment in which the network is installed. That is, if traffic load is generally high, the network may configure RSSI in an M-RS transmission duration for channel quality measurement reflecting maximum traffic load. On the other hand, if traffic load is generally low, the network/BS may configure a region in which the M-RS is not transmitted as an RSSI measurement region and the UE may perform long-term filtering (e.g., may calculate the average over a long time), in order to reflect actual traffic load. As a method of reducing signaling overhead while reflecting various communication environments, the following signaling subslot level signaling method(s) may be considered.

Method 2-1) 1-bit or 2-bit Indication

As mentioned above, whether RSSI will be measured in a subslot in which the M-RS is transmitted or in the other subslots may be indicated by one bit. In this case, units of subslots may be predetermined or may be configured through signaling. For example, when an SS/PBCH block is used as the M-RS and the SS/PBCH block is allocated in units of 7 OFDM symbols, the 7 OFDM symbols may be defined as one subslot. In this state, if the network/BS instructs the UE to use a subslot including the SS/PBCH block as an RSSI resource with respect to a target cell, the UE determines which subslot will be used for RSSI measurement using other system information (OSI) (e.g., system information except for SIB1 among system information blocks (SIBs)) or using RSRP measurement resource information (which is also called an actually transmitted SS/PBCH block)) transmitted through RRC signaling and measures RSSI using a resource within the corresponding subslot. Conversely, if the network/BS instructs the UE to use a duration in which the SS/PBCH block is not transmitted as the RSSI resource, the UE measures RSSI using a resource within subslot(s) except for an RSRP measurement resource (i.e., a slot or a subslot including the actually transmitted SS/PBCH block). In addition, as an additional indication state, a state indicating that all subslots should be used for RSSI measurement may be defined. In this case, 1 bit or 2 bits may be used to transmit information about a measurement slot or subslot. However, if RSSI is configured to be measured in a subslot in which the M-RS is not transmitted or in all subslots, Method 2-1 has problems in that there is no method of excluding a UL slot even when the UL slot is present within a measurement window and a specific subslot cannot be controlled to be measured under control of the network. Therefore, more flexible methods may be needed to configure an RSSI measurement resource. Hereinafter, more flexible methods of configuring the RSSI measurement resource will be additionally proposed.

Method 2-2) N-Subslot Duration and Offset

Generally, although an M-RS such as an SS/PBCH block may be flexibly allocated so that the M-RS may be transmitted at various slot locations, the M-RS may be configured to be collectively transmitted at a front part of an entire transmittable duration (e.g., a half-frame of 5 ms in the case of the SS/PBCH of NR) for efficiency according to RSRP measurement of the UE or power saving of the BS. Even if the M-RS is not collectively transmitted, since a cell generally does not use up to the maximum number of SS/PBCH blocks, an SS/PBCH block may be shown only in a partial duration of a measurement window. Thus, if the M-RS is collectively transmitted in a partial time resource within an entire measurement window, a resource for RSSI measurement may be allocated in the form of a specific duration. For example, an offset of a predetermined time from a start point of a measurement window or an M-RS first transmission time point of a target cell, and a measurement duration from a time point according to the offset may be indicated as a measurement resource. In this scheme, the network/BS may signal a measurement duration (of a subslot level) and an offset value indicating a start subslot location at which the UE will start measurement. For example, when the unit of a subslot is configured as 7 OFDM symbols and 5 ms consists of 80 subslots (e.g., when the SS/PBCH block is transmitted at a 120-kHz subcarrier spacing in an NR system), if a basic unit for a duration and an offset is one subslot, 12 bits are needed to indicate the duration and the offset and, if the basic unit for the duration and the offset is 4 subslots, 8 bits are needed to indicate the duration and the offset.

Method 2-3) Slot or Subslot Group Bitmap

Since Method 2-2 described above indicates a predetermined duration, if the M-RS is transmitted as a distributed type within a measurement window, measurement of RSSI only in an M-RS region may cause increase in signaling overhead or may be very inefficient because the entire measurement window should be inevitably configured as an RSSI measurement resource. A method of fully flexibly allocating the RSSI measurement resource uses a full bitmap in units of slots or subslots. However, a full bitmap for all subslots may cause remarkable overhead. For example, when the unit of a subslot is configured as 7 OFDM symbols and 5 ms consists of 80 subslots, the network/BS should transmit a bitmap consisting of about 80 bits. Since signaling of the 80-bit bitmap to configure the RSSI measurement resource causes significantly remarkable overhead, the RSSI measurement resource within the measurement window may be configured in units of subslot groups rather than in units of subslots and a bitmap may be transmitted in units of subslot groups. In this method, the number of bits necessary for a bitmap for configuring the RSSI measurement resource is changed according to the size of a subslot group. For example, if 8 subslots are configured as one subslot group, the network/BS may transmit configuration information of the RSSI measurement resource to the UE using about 10 bits.

Method 2-4) Subslot Group Bitmap and Subslot Bitmap Within Subslot Group

When the network generally allocates/configures an M-RS, Method 2-2 and Method 2-3 described above may be efficiently used by collectively allocating/configuring the M-RS resource to some degree, i.e., by consecutively allocating/configuring the M-RS resource in the time domain. However, when the M-RS resource is allocated/configured in consecutive time resources, there is a problem in that scheduling for urgent traffic such as URLLC during a long-term duration cannot be performed. Accordingly, when the M-RS is distributively allocated within a measurement window, Method 2-2 may be very inefficient in that signaling overhead increases or RSSI should always be configured using all measurement windows and Method 2-3 may be very inefficient in that a full bitmap uses too many bits to configure the RSSI measurement resource. If the M-RS has a distributed allocation characteristic, a method may be used in which the network/BS additionally provides the UE with information about which subslot within all indicated subslot groups can be used as the RSSI measurement resource (i.e., RSSI measurement resource location information to be commonly applied to the indicated subslot groups) together with indicating a bitmap for a subslot group proposed in Method 2-3. For example, in the example proposed in Method 2-3 (i.e., the case in which 5 ms consists of 80 subslots and each subslot group consists of 8 subslots), a total of an 18-bit bitmap including a 10-bit subslot group bitmap plus an 8-bit subslot bitmap within a subslot group may be transmitted to configure the RSSI measurement resource.

Figure 5:
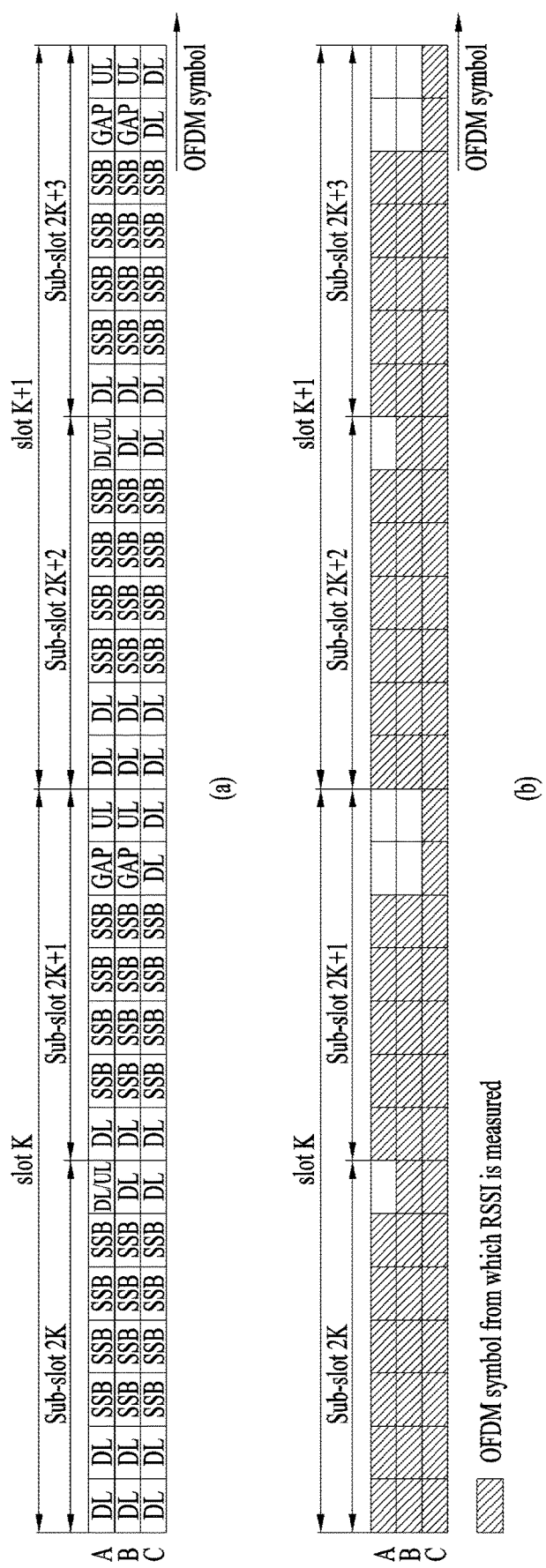
FIG. 5 is a diagram for explaining a method of configuring an RSSI measurement resource for an RSSI measurement subslot (group).

Section 3) OFDM Symbol-Level Configuration Within A Measurement Subslot or Subslot Group for RSSI Measurement FIG. 5 is a diagram for explaining a method of configuring an RSSI measurement resource for an RSSI measurement subslot (group).

In Section 2, methods of configuring a measurement resource at a subslot (i.e., OFDM symbol group) level have been described. Additionally, in a system supporting time division duplex (TDD), such as an NR system, DL traffic and UL traffic may be mixedly transmitted even in one slot. That is, various slot formats may be present, for example, DL only consisting of only DL symbols, DL control-UL traffic consisting of symbols(s) for a DL control signal and symbol(s) for UL traffic, DL control-DL traffic-UL control consisting of symbol(s) for a DL control signal, symbol(s) for UL traffic, and symbols for a UL control signal, and UL only consisting of only UL symbols. For reference, in NR, a slot may consist of 14 OFDM symbols and, according to the definition of a subslot, the slot may consist of a plurality of subslots. When DL and UL traffic/control signals are transmitted in one slot, it is necessary to determine which resource is proper for RSSI measurement. Generally, RSRQ is used to reflect the quality of a signal as well as the strength of a signal from a target cell in order to determine a cell to which the UE is to move. Accordingly, RSSI for RSRQ is desirably measured using only a DL signal. However, if a UL/DL configuration of TDD (e.g., a configuration indicating whether a slot is UL or DL or a configuration indicating whether each OFDM symbol in a slot is UL or DL) per cell, such as dynamic TDD, is changed, the quality of a target cell may not be determined only by DL traffic. In this case, it may be necessary to perform RSSI measurement even for a UL signal. From this viewpoint, the network/BS may basically instruct the UE to measure RSSI except for a UL signal. In this case, at a slot level, the network/BS may instruct the UE to measure RSSI excluding a slot in which UL traffic is transmitted by the method proposed in Section 2 and, additionally, instruct the UE to measure RSSI excluding a symbol in which a UL control signal has a possibility of being transmitted. Unless additional indication is given, a UL control region may be defined to be excluded from the RSSI measurement resource. However, if it is necessary to use the UL signal for the RSSI measurement resource, the network/BS may primarily include a UL slot at a subslot level and may additionally instruct the UE to use all OFDM symbols in a subslot.

In this way, when a serving cell and a neighbor cell use different UL/DL configurations so that a UL resource and a DL resource are mixed in one slot or symbol, the BS should inform the UE of information about a UL/DL configuration for a slot of a measurement target cell and of a symbol to be used among symbols within an RSSI measurement window. However, in terms of the UE, it is not important which UL/DL configuration is used by target cells and only information about which symbol is used for RSSI measurement is needed. Accordingly, the BS defines 1) a resource format in which DL and UL are not distinguished or an RSSI measurement slot consists of DL only so that all symbols of the RSSI measurement slot are included as the RSSI measurement resource, and 2) a resource format in which only symbols configured as DL are included as the RSSI measurement resource based on all available UL/DL configurations (in a situation in which a DL/UL configuration is switched) in order for the UE to use only symbols configured as DL for RSSI measurement. Then, the BS may inform the UE of which one of these formats will be used. A description will be given below with reference to FIG. 5. In FIG. 5, "GAP" denotes a symbol for switching to UL from DL, "DL" denotes a DL symbol, "SSB" denotes a symbol for transmitting an SS/PBCH block, "UL" denotes a UL symbol, and "DL/UL" denotes a symbol in which DL and UL may be mixed. FIG. 5(a) illustrates a UL/DL configuration for OFDM symbols in a slot in which an SS/PBCH block is assumed/indicated to be transmitted within a measurement window in a state in which the SS/PBCH block is used as an M-RS and illustrates a UL/DL transmission format in an available slot according to subcarrier spacing. In FIG. 5(a), C denotes a DL only slot, B denotes the case in which DL control-DL traffic-UL traffic is transmitted in a state in which the SS/PBCH block (SSB) and data have the same subcarrier spacing, and A denotes the case in which DL control-DL traffic-UL traffic is transmitted in a state in which the SSB and data have different subcarrier spacings. If a symbol index is assigned based on the SSB and a subcarrier spacing of a data channel is greater than a subcarrier spacing of the SSB, since a plurality of data channel symbols may be mapped within one symbol based on the SSB, a DL channel and a UL channel may be mixed within one symbol based on the subcarrier spacing of the SSB such as a symbol denoted by "DL/UL" in A of FIG. 5(a).

Considering a DL/UL structure available for each slot, for example, a measurement resource format including the cases illustrated in FIG. 5(a) may be similar to a structure of FIG. 5(b). In FIG. 5(b), the UE may measure RSSI for OFDM symbols expressed as hatched lines within a slot without information about a UL/DL configuration for OFDM symbols of the slot. To designate one of measurement resource formats as illustrated in FIG. 5(b), 2-bit information is needed. FIG. 5 shows an example in which the SS/PBCH block is used as the M-RS. If other RS types are used or various slot formats are considered, a variety of measurement resource formats different from the format of FIG. 5(b) or including the format of FIG. 5(b) may be configured. That is, measurement resource formats within a slot are predefined in consideration of an RS type and a slot format and the BS may inform the UE of which one of the defined measurement resource formats will be used. In other words, OFDM symbol patterns for RSSI measurement within a slot may be predefined and the network/BS may inform the UE of which one of the predefined OFDM symbol patterns will be applied to slots indicated for RSSI measurement. In this case, although for which symbol in a slot RSSI should be measured may differ according to slots, if the network/BS informs the UE of different RSSI measurement OFDM symbols according to slots, this causes significant signaling overhead. The present invention uses a scheme of commonly applying one measurement resource format to all slots (indicated for RSSI measurement). In addition, when the length of a subslot is less than or greater than the length of a slot, since a measurement resource format for the slot has been designated, it is necessary to reinterpret, at a subslot level, the presence of a UL control signal defined at a slot level. That is, in a state in which any subslot is configured to be used for RSSI measurement at a subslot level, if the length of a slot for configuring a symbol level does not match the length of a subslot used at a subslot level, reinterpretation is needed. For example, if the subslot consists of 7 symbols and the slot consists of 14 symbols, a bitmap consisting of bits corresponding one-to-one to the subslots within a measurement window is configured at a subslot level as the RSSI measurement resource and, if a symbol level configuration for the RSSI measurement resource is performed in units of 14 symbols, i.e., in units of slots, two subslots are grouped into units of 14 symbols, i.e., units of slots, and a symbol level configuration may be applied.

Figure 6:
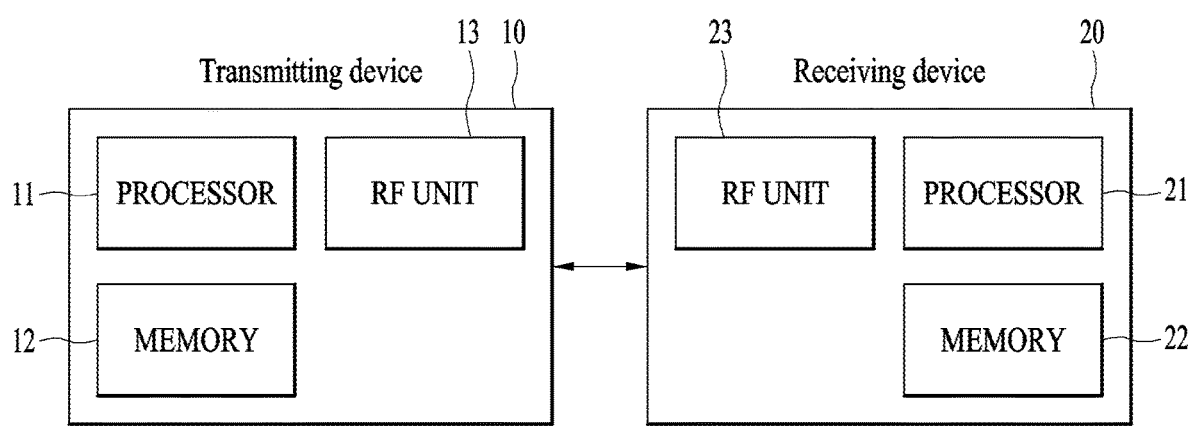
FIG. 6 is a block diagram illustrating elements of a transmitting device 10 and a receiving device 20 for implementing the present invention.

FIG. 6 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas. In the present invention, the RF unit is also referred to as a transceiver.

In the present invention, the RF units 13 and 23 may support Rx BF and Tx BF. For example, in the present invention, the RF units 13 and 23 may be configured to perform the function illustrated in FIG. 2.

In the examples of the present invention, a UE operates as the transmitting device 10 in UL and as the receiving device 20 in DL. In the embodiments of the present invention, a BS operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the BS will be referred to as a BS processor, a BS RF unit, and a BS memory, respectively.

The BS processor may control the BS RF unit to transmit, to the UE, RRM measurement configuration information that configures to report RSRP or RSRQ. The BS processor may control the BS RF unit to transmit the RRM measurement configuration information to the UE according to the present invention. The UE processor may control the UE RF unit to receive the RRM measurement configuration information and may perform RRM measurement according to the present invention based on the RRM measurement configuration information.

For example, the BS processor of the present invention may control the BS RF unit to transmit the RRM measurement configuration information including configuration about an RSSI measurement resource. The configuration information about the RSSI measurement resource may include configuration information about an RSSI measurement window (or RSRP measurement window), RSSI measurement time resource unit configuration information indicating a time resource unit (e.g., a slot or a subslot) in which the UE can perform RSSI measurement within an RSSI/RSRP measurement window, and/or RSSI measurement symbol information indicating OFDM symbols in which RSSI is to be measured within time resource unit(s) indicating that the UE can perform RSSI measurement. The RSSI measurement symbol information may be commonly applied to the indicated RSSI time resource units. Formats indicating locations of OFDM symbols available for RSSI measurement within a slot may be predefined and the RSSI measurement symbol information may be information indicating one of the predefined formats. The UE RF unit may receive the configuration information about the RSSI measurement resource from the BS and the UE processor may measure RSSI in RSSI measurement OFDM symbols based on the configuration information about the RSSI measurement resource.

The BS processor may control the BS RF unit to transmit configuration information about an RSRP measurement resource. The UE RF unit may receive the configuration information about the RSRP measurement resource and the UE processor may measure RSRP based on the configuration about the RSRP measurement resource.

The UE processor may calculate RSRQ based on RSRP and RSSI. The UE processor may control the UE RF unit to transmit an RRM report including RSRP and/or RSRQ.

The BS processor may control the BS RF unit to receive the RRM report including RSRP and/or RSRQ.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Industrial Applicability

The embodiments of the present invention are applicable to a BS, a UE, or other devices in a wireless communication system.

The invention claimed is:

1. A method of measuring a received signal strength indicator (RSSI) by a user equipment (UE) in a wireless communication system, the method comprising:
receiving, from a base station, (i) first information indicating a set of time resource units, within a measurement window, in which to measure the RSSI, and (ii) second information comprising a 2-bit index indicating one of a plurality of predefined formats, wherein each of the plurality of predefined formats represents a different set of orthogonal frequency division multiplexing (OFDM) symbol locations, within a time resource unit, in which to measure the RSSI; and
measuring the RSSI in the set of OFDM symbol locations represented by the predefined format indicated by the second information, for each time resource unit in the set of time resource units indicated by the first information.

2. The method of claim 1,
wherein each of the time resource units consists of a plurality of consecutive OFDM symbols in a time domain.

3. The method of claim 1,
wherein the measurement window comprises a resource of a synchronization signal (SS) block that comprises an SS and a physical broadcast channel.

4. A user equipment configured to measure a received signal strength indicator (RSSI) in a wireless communication system, the user equipment comprising,
a transceiver;
at least one processor; and
at least one computer memory operably connectable to the at least one processor and storing instructions that, when executed by the at least one processor, perform operations comprising:
receiving, from a base station through the transceiver, (i) first information indicating a set of time resource units, within a measurement window, in which to measure the RSSI, and (ii) second information comprising a 2-bit index indicating one of a plurality of predefined formats, wherein each of the plurality of predefined formats represents a different set of orthogonal frequency division multiplexing (OFDM) symbol locations, within a time resource unit, in which to measure the RSSI; and
measuring the RSSI in the set of OFDM symbol locations represented by the predefined format indicated by the second information, for each time resource unit in the set of time resource units indicated by the first information.

5. The user equipment of claim 4,
wherein each of the time resource units consists of a plurality of consecutive OFDM symbols in a time domain.

6. The user equipment of claim 4,
wherein the measurement window comprises a resource of a synchronization signal (SS) block that comprises an SS and a physical broadcast channel.

7. A method of configuring measurement of a received signal strength indicator (RSSI) for a user equipment by a base station in a wireless communication system, the method comprising:
transmitting, to the user equipment, (i) first information indicating a set of time resource units, within a measurement window, in which to measure the RSSI, and (ii) second information comprising a 2-bit index indicating one of a plurality of predefined formats, wherein each of the plurality of predefined formats represents a different set of orthogonal frequency division multiplexing (OFDM) symbol locations, within a time resource unit, in which to measure the RSSI; and
receiving, from the user equipment, reference signal received quality (RSRQ) information based on the user equipment measuring the RSSI in the set of OFDM symbol locations represented by the predefined format indicated by the second information, for each time resource unit in the set of time resource units indicated by the first information.

8. A base station configured to configure measurement of a received signal strength indicator (RSSI) for a user equipment in a wireless communication system, the base station comprising:
a transceiver;
at least one processor; and
at least one computer memory operably connectable to the at least one processor and storing instructions that, when executed by the at least one processor, perform operations comprising:
transmitting, to the user equipment through the transceiver, (i) first information indicating a set of time resource units, within a measurement window, in which to measure the RSSI, and (ii) second information comprising a 2-bit index indicating one of a plurality of predefined formats, wherein each of the plurality of predefined formats represents a different set of orthogonal frequency division multiplexing (OFDM) symbol locations, within a time resource unit, in which to measure the RSSI; and
receiving, from the user equipment through the transceiver, reference signal received quality (RSRQ) information based on the user equipment measuring the RSSI in the set of OFDM symbol locations represented by the predefined format indicated by the second information, for each time resource unit in the set of time resource units indicated by the first information.

9. The method of claim 1, wherein the first information comprises a bitmap that indicates the set of time resource units, within the measurement window, in which to measure the RSSI.

10. The user equipment of claim 4, wherein the first information comprises a bitmap that indicates the set of time resource units, within the measurement window, in which to measure the RSSI.

11. The method of claim 1, wherein the plurality of predefined formats consists of at least 3 predefined formats that represent at least 3 different sets of OFDM symbol locations within the time resource unit in which to measure the RSSI, and wherein the 2-bit index in the second information indicates one set of OFDM symbols among the at least 3 different sets of OFDM symbols within the time resource unit in which to measure the RSSI.

* * * * *